No. 712,576. Patented Nov. 4, 1902.
J. F. O. McMATH.
DENTAL INSTRUMENT.
(Application filed July 21, 1902.)

(No Model.)

WITNESSES:
Cornelia Bell Gantt
Williard Thompson Hurley

John Frederick Orville McMath
INVENTOR.

BY David Ralph Van Amringe
ATTORNEY

THE NORRIS PETERS CO., PHOTO-LITHO., WASHINGTON, D. C.

UNITED STATES PATENT OFFICE.

JOHN FREDERICK ORVILLE McMATH, OF OAKLAND, CALIFORNIA, ASSIGNOR TO J. M. GAMBLE AND D. R. VAN AMRINGE, OF OAKLAND, CALIFORNIA.

DENTAL INSTRUMENT.

SPECIFICATION forming part of Letters Patent No. 712,576, dated November 4, 1902.

Application filed July 21, 1902. Serial No. 116,398. (No model.)

*To all whom it may concern:*

Be it known that I, JOHN FREDERICK ORVILLE MCMATH, a citizen of the United States, residing at Oakland, in the county of Alameda, State of California, have invented a new and useful Dental Instrument, of which the following is a specification.

My invention relates to an improvement in a dental instrument, more specifically designated an "amalgam-carrier," an improvement over other dental instruments of the same general class, because my invention has a flexible bowl to serve as a receptacle for the holding or carrying of amalgam or other semisolid masses used in the filling and treating of teeth.

The objects of my invention are, first, to provide a spoon-shaped instrument into the bowl of which amalgam or other semisolid material used for aforesaid purposes may be conveniently packed and carried or held against or about a tooth or other resistive surface while a cavity in a tooth is being filled; second, to provide a flexible bowl to said instrument, so that when the orifice of the bowl of the instrument is held against a tooth or other resistive surface the rim of the bowl shall, owing to its flexibility, adjust itself to the irregularities in the shape of the tooth or other resistive surface, thereby preventing such semisolid contents as may be contained within the bowl of the instrument from escaping while slight pressure is applied; third, to provide an instrument the rim of the bowl of which may be pressed or drawn away in one or more positions, while the said rim shall closely approximate the tooth or other resistive surface except where so pressed or drawn away, thus facilitating the working within a cavity with a second instrument without the withdrawal of the amalgam-carrier. I attain these objects by the combination of a rubber cup attached to a handle, substantially as shown in the accompanying drawings, in which the instrument is shown in horizontal position.

Figure 1:
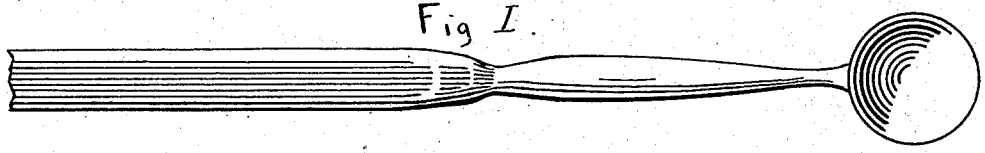
Figure 2:
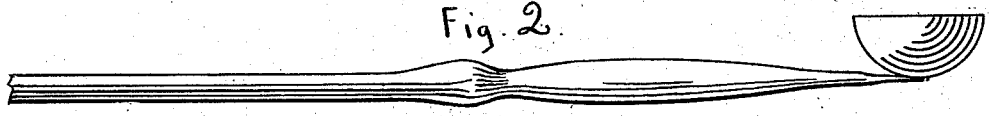
Figure 3:
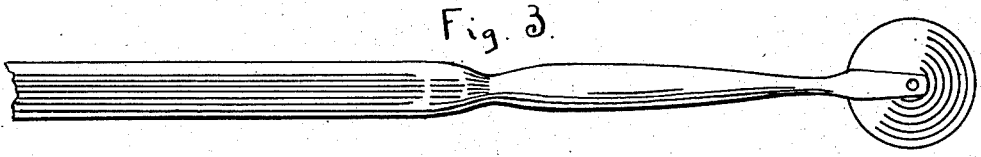
Figure 4:
Figure 4:

Figure 1 shows the instrument and a top view of the bowl; Fig. 2, the same and a side view of bowl; Fig. 3, the same and a bottom view of the bowl. Fig. 4 shows the bowl and handle detached and a sectional view of the bowl, A being the handle, B being the bowl, C being a screw attaching the bowl to the handle.

What I claim as my invention, and desire to secure by Letters Patent, is—

The combination of a flexible or soft-rubber cup, joined to the shaft of a dental tool at right angles thereto, substantially as shown and for the purpose specified.

In testimony whereof I have signed my name to this specification in the presence of two subscribing witnesses.

JOHN FREDERICK ORVILLE McMATH.

Witnesses:
 EDWARD A. HURLEY,
 MILDRED ALICE WRIGHT.